United States Patent
Nishizawa et al.

(10) Patent No.: US 7,951,734 B2
(45) Date of Patent: May 31, 2011

(54) GLASS PLATE FOR SUBSTRATE

(75) Inventors: Manabu Nishizawa, Tokyo (JP); Yuya Shimada, Tokyo (JP); Junichiro Kase, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/752,172

(22) Filed: Apr. 1, 2010

(65) Prior Publication Data

US 2010/0190630 A1    Jul. 29, 2010

Related U.S. Application Data

(63) Continuation of application No. PCT/JP2008/070137, filed on Nov. 5, 2008.

(30) Foreign Application Priority Data

Nov. 6, 2007  (JP) .................................. 2007-288086

(51) Int. Cl.
*C03C 3/085*   (2006.01)
*C03C 3/091*   (2006.01)

(52) U.S. Cl. .......................................... 501/69; 501/66

(58) Field of Classification Search ................... 501/66, 501/69
See application file for complete search history.

(56) References Cited

U.S. PATENT DOCUMENTS

| | | | |
|---|---|---|---|
| 4,562,161 A * | 12/1985 | Mennemann et al. | 501/59 |
| 6,500,778 B1 * | 12/2002 | Maeda et al. | 501/66 |
| 2002/0065187 A1 * | 5/2002 | Bordeaux et al. | 501/67 |
| 2003/0121916 A1 * | 7/2003 | Ishihara | 220/2.2 |
| 2004/0063564 A1 * | 4/2004 | Kawai et al. | 501/68 |
| 2005/0215414 A1 * | 9/2005 | Kawai | 501/69 |
| 2008/0254301 A1 * | 10/2008 | Fechner et al. | 428/432 |
| 2009/0075805 A1 * | 3/2009 | Kurachi et al. | 501/59 |
| 2009/0088309 A1 * | 4/2009 | Niida et al. | 501/59 |

FOREIGN PATENT DOCUMENTS

| | | |
|---|---|---|
| JP | 09-052729 | 2/1997 |
| JP | 11-240735 | 9/1999 |
| JP | 11-310429 | 11/1999 |
| JP | 2002-516600 | 6/2002 |
| JP | 2003-335547 | 11/2003 |
| JP | 2006-137631 | 6/2006 |
| JP | 2006-143523 | 6/2006 |
| JP | 2006-169028 | 6/2006 |
| WO | 99/35100 | 7/1999 |
| WO | WO 2005/118499 A1 | 12/2005 |
| WO | WO 2006/080292 A1 | 8/2006 |
| WO | WO 2007/069729 A1 | 6/2007 |

OTHER PUBLICATIONS

Derwent Abstract 1996-384360 and Machine Translation of JP 09-052729 A, Feb. 25, 1997.*
Derwent Abstract 2004-028165 and Machine Translation of JP 2003-335547 A A, Nov. 25, 2003.*
Derwent Abstract 1999-554995 and Machine Translation of JP 11-240735 A, Sep. 7, 1999.*
U.S. Appl. No. 12/693,482, filed Jan. 26, 2010, Shimada, et al.
Extended Search Report issued Nov. 30, 2010 in EP Application No. 08846918.4.

* cited by examiner

*Primary Examiner* — Karl E Group
*Assistant Examiner* — Elizabeth A Bolden
(74) *Attorney, Agent, or Firm* — Oblon, Spivak, McClelland, Maier & Neustadt, L.L.P.

(57) ABSTRACT

A glass plate for a substrate, which contains no $B_2O_3$, and which can be as a glass plate for an LCD panel, which comprises, as a glass matrix composition as represented by mass % based on oxide of $SiO_2$: 68 to 80, $Al_2O_3$: 0.1 to 5, MgO: 9.5 to 12, CaO+SrO+BaO: 0 to 2, and $Na_2O+K_2O$ 6 to 14, and which has a density of at most 2.45 g/cm$^3$, an average coefficient of thermal expansion from 50 to 350° C. of at most $75 \times 10^{-7}$/° C., a glass transition point of at least 600° C. and a brittleness of at most 6.5 $\mu m^{-1/2}$.

6 Claims, No Drawings

GLASS PLATE FOR SUBSTRATE

TECHNICAL FIELD

The present invention relates to a glass plate for a substrate to be used for display panels such as a liquid crystal display (LCD) panel and a plasma display panel (PDP) and a substrate for a solar battery. The glass plate for a substrate of the present invention is particularly suitable as a glass plate for an LCD panel.

BACKGROUND ART

Heretofore, as a glass substrate for an LCD panel, an alkali-free glass containing no alkali metal oxide has been used. The reason is that if an alkali metal oxide is contained in a glass substrate, alkali ions in the glass plate will be diffused into a semiconductor film of a thin film transistor (TFT) to be used for driving an LCD panel during heat treatment carried out in a process for producing an LCD panel, thus leading to deterioration of the TFT characteristics.

Further, since an alkali-free glass has a low coefficient of thermal expansion and a high glass transition point (Tg), its change in dimensions in a process for producing an LCD panel is small, and the influence over the display quality by thermal stress at the time of use of the LCD panel is small, and accordingly it is preferred as a glass substrate for an LCD panel.

However, an alkali-free glass has the following drawbacks in view of production.

An alkali-free glass has very high viscosity and is hardly molten, and its production involves technical difficulty.

Further, in general, only a poor effect of a refining agent can be produced for an alkali-free glass. For example, in a case where $SO_3$ is used as the refining agent, since the temperature at which $SO_3$ is (decomposed and) released as bubbles is lower than the glass melting temperature, the most part of $SO_3$ added is decomposed and volatilized from the molten glass before refining is carried out, and no sufficient refining effect will be achieved.

In recent development of technology, use of an alkali glass substrate containing an alkali metal oxide as the glass substrate for an LCD panel begins to be studied (Patent Documents 1 and 2). Since glass containing an alkali metal oxide generally has a high coefficient of thermal expansion, in order to obtain a coefficient of thermal expansion preferred as a glass substrate for an LCD panel, $B_2O_3$ having an effect to lower the coefficient of thermal expansion is usually contained (Patent Documents 1 and 2).

However, in the case of a glass composition containing $B_2O_3$, $B_2O_3$ is volatilized when the glass is melted particularly in a melting step and in a refining step, whereby the glass composition tends to be inhomogeneous. If the glass composition is inhomogeneous, flatness when the glass is formed into a plate shape tends to be influenced. A glass substrate for an LCD panel is required to have high flatness so as to keep a constant distance between two sheets of glass sandwiching a liquid crystal i.e. cell gap, so as to secure the display quality. Accordingly, in order to secure a predetermined flatness, after glass is formed into plate glass by float process, the surface of the plate glass is polished. If no desired flatness of the plate glass after forming is achieved, the time required for the polishing step will be long, thus lowering the productivity. Further, considering the environmental burden by volatilization of $B_2O_3$, the content of $B_2O_3$ in the molten glass is preferably lower, and it is more preferred that substantially no $B_2O_3$ is contained.

However, in a case where the $B_2O_3$ content is low, and further, in a case where substantially no $B_2O_3$ is contained, it has been difficult to lower the coefficient of thermal expansion to a level preferred as a glass substrate for an LCD panel. Further, it has also been difficult to obtain a predetermined Tg, etc. while the increase in the viscosity is suppressed. Further, an alkali glass substrate having a low $B_2O_3$ content, or further, containing substantially no $B_2O_3$, has a problem that it is easily damaged.

Patent Document 1: JP-A-2006-137631
Patent Document 2: JP-A-2006-169028

DISCLOSURE OF THE INVENTION

Objects to be Accomplished by the Invention

In order to solve the above problems of prior art, the object of the present invention is to provide a glass plate for a substrate which contains a very small amount of an alkali metal oxide and has a low $B_2O_3$ content, preferably contains substantially no $B_2O_3$, and which can be used as a glass substrate for an LCD panel or the like.

Means to Accomplish the Object

The present inventors have conducted extensive studies to achieve the above objects and as a result, accomplished the present invention.

That is, the present invention provides a glass plate for a substrate, which comprises, as a glass matrix composition as represented by mass % based on oxide:

| | |
|---|---|
| $SiO_2$ | 68 to 80, |
| $Al_2O_3$ | 0.1 to 5, |
| $B_2O_3$ | 0 to 3, |
| MgO | 9.5 to 12, |
| CaO + SrO + BaO | 0 to 2, and |
| $Na_2O + K_2O$ | 6 to 14 | has a density of at most 2.45 g/cm$^3$, has an average coefficient of thermal expansion from 50 to 350° C. of at most 75×10$^{-7}$/° C., has a glass transition point (Tg) of at least 600° C., and has a brittleness of at most 6.5 μm$^{-1/2}$.

The glass plate for a substrate of the present invention preferably contains substantially no $B_2O_3$.

Further, the glass plate for a substrate of the present invention preferably has a heat shrinkage (C) of at most 20 ppm.

Further, according to a first embodiment of the glass plate for a substrate of the present invention, it comprises, as represented by mass % based on oxide:

| | |
|---|---|
| $Na_2O$ | 6 to 14, and |
| $K_2O$ | at least 0 and less than 3, | and where the viscosity is η, has a temperature which satisfies log η=2.5 of at most 1,620° C.

According to a second embodiment of the glass plate for a substrate of the present invention, it comprises, as represented by mass % based on oxide:

| | |
|---|---|
| $Na_2O$ | at least 0 and less than 3, and |
| $K_2O$ | 6 to 14 | and has a Tg of at least 640° C.

According to a third embodiment of the glass plate for a substrate of the present invention, it comprises, as represented by mass % based on oxide:

| | |
|---|---|
| Na$_2$O | 3 to 11, and |
| K$_2$O | 3 to 11 | has a Tg of at least 620° C., and where the viscosity is η, has a temperature which satisfies log η=2.5 of at most 1,670° C.

Effects of the Invention

The glass plate for a substrate of the present invention has an average coefficient of thermal expansion from 50 to 350° C. of at most 75×10$^{-7}$/° C. and a Tg of at least 600° C., and accordingly the change in dimensions in a process for producing a panel is small, and the influence over the display quality by thermal stress at the time of use of the panel is small. Thus, the glass plate is suitable particularly as a glass substrate for an LCD panel.

Further, the glass plate for a substrate of the present invention has a low B$_2$O$_3$ content, preferably contains substantially no B$_2$O$_3$, whereby volatilization of B$_2$O$_3$ is small, preferably there is no volatilization of B$_2$O$_3$ at the time of production of glass. Accordingly, the glass plate is excellent in homogeneity and flatness, and after a glass plate is formed, only a low degree of polishing of the glass plate surface is required, thus leading to excellent productivity.

Further, the glass plate for a substrate of the present invention is hardly damaged and has a brittleness as described hereinafter of at most 6.5 μm$^{-1/2}$ and is thereby suitable as a glass plate for a display panel and as a glass plate for a solar battery.

The glass plate for a substrate of the present invention has a low density of at most 2.45 g/cm$^3$, and is thereby preferred in view of handling efficiency when used as a display panel, particularly a large-sized display panel.

Further, the glass plate of the present invention has a heat shrinkage (C) of preferably at most 20 ppm, and accordingly the compaction is low in heat treatment at low temperature (150 to 300° C.) in a process for producing a TFT panel, and slippage of the film formation pattern on a glass substrate hardly occurs.

Further, according to the first embodiment of the glass plate for a substrate of the present invention, the viscosity is low particularly at the glass melting temperature, and accordingly starting materials are easily melted, and the production is easily carried out.

Further, when SO$_3$ is used as a refining agent, the viscosity is low, and accordingly an excellent refining effect is achieved, and excellent bubble quality is achieved.

Further, according to the second embodiment of the glass plate for a substrate of the present invention, since Tg is at least 640° C., the change in dimensions in a process for producing a panel is smaller, and the influence over the display quality by thermal stress at the time of use of the panel is particularly small.

Further, according to the third embodiment of the glass plate for a substrate of the present invention, the viscosity at the glass melting temperature is relatively low, and Tg is relatively high, and accordingly it is a glass plate for a substrate having advantages of both the first embodiment and the second embodiment of the glass plate for a substrate of the present invention.

The glass plate for a substrate of the present invention is suitable as a glass substrate for an LCD panel, and can be used as a substrate for other displays, such as a plasma display panel (PDP) and an inorganic electroluminescence display. For example, when it is used as a glass plate for PDP, since it has a low coefficient of thermal expansion as compared with a conventional glass plate for PDP, breakage of glass in the heat treatment step can be suppressed.

Further, the glass plate for a substrate of the present invention can be used for application other than display panels. It can be used, for example, as a glass plate for a solar battery substrate.

BEST MODE FOR CARRYING OUT THE INVENTION

Now, the glass plate for a substrate of the present invention will be described.

In the following, % means "mass %" unless otherwise specified.

The glass plate for a substrate of the present invention comprises, as a glass matrix composition as represented by mass % based on oxide:

| | |
|---|---|
| SiO$_2$ | 68 to 80, |
| Al$_2$O$_3$ | 0.1 to 5, |
| B$_2$O$_3$ | 0 to 3, |
| MgO | 9.5 to 12, |
| CaO + SrO + BaO | 0 to 2, and |
| Na$_2$O + K$_2$O | 6 to 14 | has a density of at most 2.45 g/cm$^3$, has an average coefficient of thermal expansion from 50 to 350° C. of at most 75×10$^{-7}$° C., has a Tg of at least 600° C., and has a brittleness of at most 6.5 μm$^{-1/2}$.

Preferably, the glass plate of the present invention contains substantially no B$_2$O$_3$.

The reason why the composition of the glass plate for a substrate of the present invention is limited to the above is as follows.

The glass plate for a substrate of the present invention has a B$_2$O$_3$ content of so low as at most 3%, preferably contains substantially no B$_2$O$_3$. Accordingly, in a melting step, a refining step and a forming step when glass is melted in production of a glass plate, particularly in a melting step and a refining step, volatilization of B$_2$O$_3$ is small, preferably there is no volatilization, and a glass plate to be produced is excellent in homogeneity and flatness. As a result, when the glass plate is used as a glass plate for an LCD panel which requires a high degree of flatness, the amount of polishing the glass plate is small as compared with a conventional glass plate for a display panel.

Further, considering the environmental burden by volatilization of B$_2$O$_3$, the B$_2$O$_3$ content is preferably lower. Accordingly, the B$_2$O$_3$ content is preferably from 0 to 2.0%, and it is more preferred that substantially no B$_2$O$_3$ is contained. When reduction of bubbles in glass is considered, B$_2$O$_3$ is preferably contained in an amount of at most 2.0%, more preferably at most 1.5%, particularly preferably at most 1.0.

In the present invention, "substantially no certain component is contained" means that the certain component is not contained except for inevitable impurities included from a starting material or the like, that is, it is not contained on purpose.

$SiO_2$ is a component to form a skeleton of glass, and if its content is less than 68%, Tg will be lowered, and problems will arise such that the heat resistance and the chemical durability of the glass are lowered, the coefficient of thermal expansion is increased, the brittleness is increased, whereby the glass tends to be damaged, and the density is increased. However, if it exceeds 80%, problems will arise such that the devitrification temperature is increased, and the high temperature viscosity of the glass is increased, thus impairing the melting property.

The $SiO_2$ content is preferably from 69 to 80%, more preferably from 70 to 80%, furthermore preferably from 71 to 79.5%.

$Al_2O_3$ is contained since it has effects to increase Tg, to improve the heat resistance and the chemical durability, and to lower the coefficient of thermal expansion. If its content is less than 0.1%, Tg will be lowered, and the coefficient of thermal expansion will be increased. However, if it exceeds 5%, problems will arise such that the high temperature viscosity of the glass is increased, thus impairing the melting property, the density is increased, and the devitrification temperature is increased, thus impairing forming properties.

The $Al_2O_3$ content is preferably from 0.5 to 4.5%, more preferably from 1 to 4%.

MgO is contained since it has an effect to lower the viscosity of the glass at the melting temperature thereby to accelerate melting, and an effect to suppress an increase in the brittleness. If its content is less than 9.5%, the effect to suppress an increase in the brittleness will be insufficient, and further, the high temperature viscosity of the glass will be increased, thus impairing the melting property. However, if it exceeds 12%, problems will arise such as the phase separation of the glass, an increase in the devitrification temperature, an increase in the density, an increase in Tg and an increase in the coefficient of thermal expansion.

The MgO content is preferably from 10 to 11.8%.

CaO, SrO and BaO have an effect to lower the viscosity of the glass at the melting temperature thereby to accelerate melting. However, it their content is high, the effect to suppress an increase in the brittleness by incorporation of MgO is inhibited, and accordingly their total content is at most 2%.

The total content of CaO, SrO and BaO is preferably at most 1%, more preferably at most 0.5%. Considering the environmental burden, it is preferred that substantially no BaO is contained.

$Na_2O$ and $K_2O$ are contained in a total content of at least 6% since they have an effect to lower the viscosity of the glass at the melting temperature thereby to accelerate melting, an effect to lower the brittleness and an effect to lower the devitrification temperature. However, if their total content exceeds 14%, problems will arise such that the coefficient of thermal expansion is increased, Tg is lowered, and the density is increased. Their total content is preferably from 7% to 14%, more preferably from 8 to 14%, furthermore preferably from 9 to 13%.

Further, $Li_2O$ may be contained so as to obtain the same effect as $Na_2O$ and $K_2O$. However, incorporation of $Li_2O$ brings about a decrease in Tg, and accordingly the $Li_2O$ content is preferably at most 5%.

Further, in a case where $Li_2O$ is contained, the total content of $Na_2O$, $K_2O$ and $Li_2O$ is preferably from 6 to 14%, more preferably from 7 to 14%, furthermore preferably from 8 to 14%, particularly preferably from 9 to 13%. However, considering to maintain a high Tg and to maintain a high refining effect by $SO_3$, it is preferred that substantially no $Li_2O$ is contained.

In the glass plate for a substrate of the present invention, in a case where the ratio ($K_2O/(Na_2O+K_2O)$) of $K_2O$ (mass %) to the total amount (mass %) of $Na_2O$ and $K_2O$ is from 0.2 to 0.8, the electrical resistance is increased by a mixed alkali effect, and when the resistivity at 150° C. is $\rho[\Omega cm]$, $\log \rho=10$ or more. Accordingly, a glass plate for a substrate wherein $K_2O/(Na_2O+K_2O)$ is from 0.2 to 0.8, which has a high electrical resistance, is suitable for such an application that a substrate is required to have insulating properties. As a substrate which is required to have insulating properties, for example, a substrate for a PDP or a substrate for a solar battery may be mentioned.

In a case where the glass plate for a substrate of the present invention is used for an application for which insulating properties are required, $Na_2O$ and $K_2O$ are preferably contained in such an amount that $K_2O/(Na_2O+K_2O)$ is from 0.25 to 0.75.

In a case where the glass plate for a substrate of the present invention is used for an application for which insulating properties are required, it is preferred that $\log \rho=10.5$ or more, more preferably $\log \rho=11$ or more.

As described above, the glass plate for a substrate of the present invention preferably comprises, as a glass matrix composition, $SiO_2$, $Al_2O_3$, MgO, CaO, SrO, $Na_2O$ and $K_2O$.

For the glass plate for a substrate of the present invention, $SO_3$ can be used as a refining agent. In the case of an alkali-containing glass such as the glass plate for a substrate of the present invention, $SO_3$ can achieve a sufficient effect as a refining agent, since the temperature at which $SO_3$ is decomposed and released as bubbles is higher than the temperature at which the starting materials become molten glass.

As a $SO_3$ source, a sulfate such as potassium sulfate ($K_2SO_4$), sodium sulfate ($Na_2SO_4$) or calcium sulfate ($CaSO_4$) is charged into the glass matrix composition material, and the amount of the sulfate is preferably from 0.05 to 1.0%, more preferably from 0.05 to 0.3% as calculated as $SO_3$ to 100% of the matrix composition starting materials.

The remaining amount in the glass plate for a substrate is from 100 to 500 ppm, preferably from 100 to 400 ppm as calculated as $SO_3$.

The glass plate for a substrate of the present invention may contain other components in addition to the above components within a range not to impair the glass plate. Specifically, it may contain F, Cl, $SnO_2$ and the like in a total content of at most 2%, preferably at most 1.5% to 100% of the matrix composition starting materials so as to improve the melting property of glass and the refining property.

Further, it may contain $ZrO_2$, $Y_2O_3$, $La_2O_3$, $TiO_2$, $SnO_2$ and the like in a total content of at most 5%, preferably at most 2% to 100% of the matrix composition starting materials so as to improve the chemical durability of the substrate glass. Among them, $Y_2O_3$, $La_2O_3$ and $TiO_2$ contribute also to an improvement in the Young's modulus of glass. In a case where a reduction of bubbles in glass is considered, $ZrO_2$ is preferably contained in an amount of at most 2.0%, more preferably at most 1.5%, particularly preferably at most 1%.

Further, it may contain a colorant such as $Fe_2O_3$ or $CeO_2$ so as to adjust the color tone of the substrate glass. The content of such a colorant is preferably at most 1 mass %, more preferably at most 3% in total to 100% of the matrix composition starting materials.

The glass plate for a substrate of the present invention preferably contains substantially no $As_2O_3$ nor $Sb_2O_3$ considering the environmental burden. Further, it preferably contains substantially no ZnO considering to carry out float process stably.

The glass plate for a substrate of the present invention has a density of at most 2.45 g/cm³.

The glass plate having a low density leads to prevention of breakage and an improvement in handling efficiency and is effective particularly when used as a glass substrate for a large-sized display. The density is preferably at most 2.44 g/cm$^3$, more preferably at most 2.43 g/cm$^3$, particularly preferably 2.40 g/cm$^3$.

The glass plate for a substrate of the present invention has an average coefficient of thermal expansion from 50 to 350° C. of at most 75×10$^{-7}$/° C., and accordingly when the glass plate for a substrate of the present invention is used as a glass plate for an LCD panel, the change in dimensions of a substrate in a heat treatment step carried out in production of an LCD panel is suppressed to a nonproblematic level.

In the present invention, the average coefficient of thermal expansion from 50 to 350° C. is a value measured by using a differential thermal dilatometer (TMA) and is a value determined in accordance with JIS R3102.

The average coefficient of thermal expansion from 50 to 350° C. is preferably at most 70×10$^{-7}$/° C., more preferably from 55×10$^{-7}$ to 65×10$^{-7}$.

The glass plate for a substrate of the present invention has a Tg of at least 600° C. When Tg is at least 600° C., the change in dimensions of a substrate in a heat treatment step carried out in production of an LCD panel can be suppressed to a substantially nonproblematic level. Tg is preferably at least 620° C., more preferably at least 640° C.

The glass plate for a substrate of the present invention is less likely to be damaged and is suitable for a display panel as compared with a conventional alkali glass plate merely containing substantially no B$_2$O$_3$. As an index of the damage resistance, the brittleness (B) can be employed. The brittleness (B) is a value calculated from the following calculation, when a Vickers indenter is pressed under a pressing load P to obtain the average "a" of two diagonal lengths of indentation and the average "c" of lengths of two crackings formed from four corners of the indentation (the total length of two symmetric crackings including the indentation).

$$B=2.39\times(c/a)^{3/2}\times P^{-1/4}$$

In the above formula, the unit is μm regarding "c" and "a", N regarding P, and μm$^{-1/2}$ regarding B.

The glass plate for a substrate of the present invention has a brittleness of at most 6.5 μm$^{-1/2}$, preferably at most 6.0 μm$^{-1/2}$, more preferably at most 5.5 μm$^{-1/2}$.

Now, a preferred embodiment of the glass plate for a substrate of the present invention will be described.

In the following, among the components of the glass plate for a substrate, points different from the above-described glass plate for a substrate of the present invention (broader concept) alone are described, and description of points the same as the broader concept glass plate for a substrate is omitted.

The glass plate for a substrate of the present invention preferably has a heat shrinkage (C) (compaction (C)) of preferably at most 20 ppm. It is preferably at most 15 ppm, more preferably at most 10 ppm. Here, the compaction means the glass heat shrinkage caused by relaxation of the glass structure at the time of heat treatment.

In the present invention, the heat shrinkage (C) means a shrinkage (ppm) in a distance between indentations obtained in such a manner that a glass plate is heated to the transition temperature Tg+50° C., held for one minute and then cooled to room temperature at 50° C./min, indentations are impressed on two portions with a predetermined distance on the surface of the glass plate, and then the glass plate is heated to 300° C., held for one hour and then cooled to room temperature at 100° C./hour.

The compaction (C) will be described more specifically.

In the present invention, the compaction (C) means a value measured by a method described below.

First, a glass plate to be measured is melted at 1,600° C., and the molten glass is cast, formed into a plate shape and then cooled. The obtained glass plate is subjected to polishing to obtain a sample of 100 mm×20 mm×2 mm.

Then, the obtained glass plate is heated to the transition temperature Tg+50° C., held at this temperature for one minute and then cooled to room temperature at a temperature-lowering rate of 50° C./min. Then, indentations are impressed at two portions in the long side direction with a distance A (A=90 mm) on the surface of the glass plate.

Then, the glass plate is heated to 300° C. at a temperature-increasing rate of 100° C./hour (=1.6° C./min), held at 300° C. for one hour, and then cooled to room temperature at a temperature-lowering rate of 100° C./hour. Then, the distance between the indentations are measured again, which is regarded as B. From A and B thus obtained, the compaction (C) is calculated by means of the following formula. Further, A and B are measured by an optical microscope.

$$C[ppm]=(A-B)/A\times 10^6$$

According to the first embodiment of the glass plate for a substrate of the present invention, it comprises, as represented by mass % base on oxide:

| | |
|---|---|
| Na$_2$O | 6 to 14, and |
| K$_2$O | at least 0 and less than 3 | and where the viscosity is η, has a temperature which satisfies log η=2.5 of at most 1,620° C.

The glass plate for a substrate according to the first embodiment has a composition mainly containing Na$_2$O among Na$_2$O and K$_2$O, and contains at least 6% of Na$_2$O.

As described above, Na$_2$O and K$_2$O have an effect to lower the viscosity of the glass at the melting temperature thereby to accelerate melting, and further have an effect to lower the brittleness and an effect to lower the devitrification temperature. Further, Na$_2$O has a high effect to lower the viscosity of the glass at the melting temperature thereby to accelerate melting as compared with K$_2$O. Accordingly, the glass plate for a substrate according to the first embodiment has a low viscosity particularly at the glass melting temperature, its starting materials are easily melted, and its production is easy. Further, due to the low viscosity, an excellent refining effect by SO$_3$ is achieved, and excellent bubble quality is achieved.

However, if the Na$_2$O content exceeds 14%, problems will arise such that the coefficient of thermal expansion is high, Tg is lowered, and the density is increased, and further, the brittleness will rather be increased.

The Na$_2$O content is preferably from 6.5 to 13%, more preferably from 7 to 12.5%.

The glass plate for a substrate according to the first embodiment may contain K$_2$O in an amount of less than 3%. The K$_2$O content is preferably at most 2%, more preferably at most 1%.

The glass plate for a substrate according to the first embodiment may contain 2% of Li$_2$O.

However, the Li$_2$O content is preferably at most 1%, and it is more preferred that substantially no Li$_2$O is contained.

According to the second embodiment of the glass plate for a substrate of the present invention, it comprises, as represented by mass % based on oxide:

| | |
|---|---|
| $Na_2O$ | at least 0 and less than 3, and |
| $K_2O$ | 6 to 14 | and has a Tg of at least 640° C.

The glass plate for a substrate according to the second embodiment has a composition mainly containing $K_2O$ among $Na_2O$ and $K_2O$, and contains at least 6% of $K_2O$.

As described above, $Na_2O$ and $K_2O$ have an effect to lower the viscosity of the glass at the melting temperature thereby to accelerate melting, and further have an effect to lower the brittleness and an effect to lower the devitrification temperature. Further, since $Na_2O$ has a high effect to lower Tg as compared with $K_2O$, the glass plate for a substrate according to the second embodiment containing mainly $K_2O$ among $Na_2O$ and $K_2O$ has a high Tg, specifically, Tg of at least 640° C. Accordingly, the change in dimensions in a process for producing a panel is smaller, and the influence over the display quality by thermal stress at the time of use of the panel is particularly small. Tg is preferably at least 660° C., more preferably at least 670° C.

However, if the $K_2O$ content exceeds 14%, the decrease in Tg is not negligible. Further, problems will arise such that the coefficient of thermal expansion is increased, Tg is lowered, and the density is increased, and further, the brittleness will rather be increased.

The $K_2O$ content is preferably from 7 to 14%, more preferably from 8 to 13%, furthermore preferably from 9 to 12%.

The glass plate for a substrate according to the second embodiment may contain $Na_2O$ in an amount of less than 3%. The $Na_2O$ content is preferably at most 2%, more preferably at most 1%.

The glass plate for a substrate according to the second embodiment may contain 2% of $Li_2O$.

However, the $Li_2O$ content is preferably at most 1%, and it is more preferred that substantially no $Li_2O$ is contained.

According to the third embodiment of the glass plate for a substrate of the present invention, it comprises, as represented by mass % based on oxide:

| | |
|---|---|
| $Na_2O$ | 3 to 11, and |
| $K_2O$ | 3 to 11 | has a Tg of at least 620° C., and where the viscosity is η, has a temperature which satisfies log η=2.5 of at most 1,670° C.

The glass plate for a substrate according to the third embodiment has a composition containing both $Na_2O$ and $K_2O$, and contains from 3 to 11% of $Na_2O$ and from 3 to 11% of $K_2O$ on the condition that the total content of $Na_2O$ and $K_2O$ is from 6 to 14%. Accordingly, the glass plate for a substrate according to the third embodiment is a glass plate having a composition between the glass plate for a substrate according to the first embodiment mainly containing $Na_2O$ and the glass plate for a substrate according to the second embodiment mainly containing $K_2O$, having a relatively low viscosity at the glass melting temperature and having a relatively high Tg (at least 620° C.). Accordingly, the glass plate for a substrate according to the third embodiment is a glass plate having advantages of both the glass plates for a substrate according to the first and the second embodiments.

In the glass plate for a substrate according to the third embodiment, each of the $Na_2O$ and $K_2O$ contents is preferably from 3 to 10%, more preferably from 3 to 9%, furthermore preferably from 3 to 8%.

The glass plate for a substrate according to the third embodiment may contain 2% of $Li_2O$.

However, the $Li_2O$ content is preferably at most 1%, and it is more preferred that substantially no $Li_2O$ is contained.

In the glass plate for a substrate according to the third embodiment, Tg is preferably at least 630° C., more preferably at least 640° C.

To produce the glass plate for a substrate of the present invention, a melting/refining step and a forming step are preferably carried out in the same manner as in production of a conventional glass plate for a display panel. Here, the glass plate for a substrate of the present invention is an alkali glass substrate containing an alkali metal oxide (such as $Na_2O$ or $K_2O$), and accordingly $SO_3$ can effectively be used as a refining agent, and float process is suitable as a forming method.

In a process for producing a glass plate for a display panel, as a method of forming glass into a plate shape, preferred is to employ float process capable of easily and stably forming a glass plate having a large area, along with the production of a large-sized liquid crystal TV, etc., in recent years.

In a melting step, starting materials of the respective components for the glass plate are prepared to achieve an aimed composition, and they are continuously charged to a melting furnace and heated to from 1,450 to 1,650° C. and melted. The resulting molten glass is formed to have a predetermined thickness by e.g. float process, annealed and cut to produce the glass plate for a substrate of the present invention.

EXAMPLES

Now, the present invention will be described in further detail with reference to Examples and Comparative Examples. However, it should be understood that the present invention is by no means restricted to such specific Examples.

Starting materials of the respective components were blended to achieve a desired composition ($SiO_2$ to $K_2O$) as identified by mass % in Tables, heated by using a platinum crucible at a temperature of from 1,550 to 1,650° C. for 3 hours and melted. For melting, a platinum stirrer was inserted and stirring was carried out for one hour to homogenize glass. Then, the resulting molten glass was cast, formed into a plate shape and then annealed.

Examples 1 to 15 and 19 to 21 are Examples of the present invention, and Examples 16 to 18 are Comparative Examples. Further, Examples 1 to 6 and 19 to 21 correspond to the glass plate for a substrate according to the first embodiment, Examples 7 to 9 correspond to the glass plate for a substrate according to the second embodiment, and Examples 10 to 15 correspond the glass plate for a substrate according to the third embodiment.

Of the glass thus obtained, the density (unit: g/cm³), the average coefficient of thermal expansion (unit: ×10⁻⁷/° C.), Tg (unit: ° C.), the brittleness (unit: $\mu m^{-1/2}$), the resistivity ρ[Ωcm] at 150° C., the temperature $T_{2.5}$ (unit: ° C.) at which the viscosity of the molten glass becomes $10^{2.5}$ dPa·s and the temperature $T_4$ (unit: ° C.) at which it becomes $10^4$ dPa·s as the high temperature viscosity, and the compaction (unit: ppm) were measured and shown in Tables 1 to 4. Here, values in brackets in Tables are ones determined by calculation. Further, in Tables, "–" means that no measurement was carried out.

Methods for measuring the respective physical properties are shown below.

Density: About 20 g of a glass block containing no bubbles was subjected to measurement using a simple densitometer by Archimedes' Principle.

Average coefficient of thermal expansion: Measurement was carried out by using a TMA (differential thermal dilatometer), and the average coefficient of thermal expansion from 50 to 350° C. was calculated by a method in accordance with JIS R3102 (1995).

Tg: Tg is a value measured by using a TMA (differential thermal dilatometer), and was obtained by a method in accordance with JIS R3103-3 (2001).

Brittleness (B): It was calculated from the following calculation, when a Vickers indenter was pressed under a load P (9.8 N) to obtain the average "a" of two diagonal lengths of indentation and the average "c" of the lengths of two crackings formed from four corners of the indentation (the total length of two symmetric crackings including the indentation):

$$B = 2.39 \times (c/a)^{3/2} \times P^{-1/4}$$

The unit is μm regarding "c" and "a", N regarding P and $\mu m^{-1/2}$ regarding B.

High temperature viscosity: Viscosities were measured by using a rotation viscometer, and the temperature $T_{2.5}$ at which the viscosity became $10^{2.5}$ dPa·s and the temperature $T_4$ at which the viscosity became $10^4$ dPa·s were measured.

In the present invention, the viscosity of $10^{2.5}$ dPa·s was employed as an index to indicate that the viscosity of the glass melt is sufficiently low in the step of melting glass. The temperature $T_{2.5}$ at which the viscosity becomes $10^{2.5}$ dPa·s is preferably at most 1,670° C., more preferably at most 1,620° C.

The viscosity of $10^4$ dPa·s is a standard viscosity at the time of float process of glass. The temperature $T_4$ at which the viscosity becomes $10^4$ dPa·s is preferably at most 1,300° C., more preferably at most 1,250° C., furthermore preferably at most 1,200° C.

Compaction (C): Measured by the above-described method for measuring the compaction (C).

TABLE 1

| | Ex. | | | | | |
|---|---|---|---|---|---|---|
| | 1 | 2 | 3 | 4 | 5 | 6 |
| SiO₂ | 79.4 | 77.2 | 76.0 | 73.7 | 75.1 | 74.0 |
| Al₂O₃ | 2.0 | 3.0 | 2.0 | 4.0 | 1.0 | 2.0 |
| MgO | 9.6 | 10.1 | 10.6 | 10.3 | 11.6 | 11.0 |
| CaO | 0.0 | 0.0 | 0.0 | 0.0 | 0.0 | 0.0 |
| SrO | 0.0 | 0.0 | 0.0 | 0.0 | 0.0 | 0.0 |
| BaO | 0.0 | 0.0 | 0.0 | 0.0 | 0.0 | 0.0 |
| Na₂O | 9.0 | 9.7 | 11.4 | 12.0 | 12.3 | 11.5 |
| K₂O | 0.0 | 0.0 | 0.0 | 0.0 | 0.0 | 1.5 |
| Na₂O + K₂O | 9.0 | 9.7 | 11.4 | 12.0 | 12.3 | 13.0 |
| CaO + SrO + BaO | 0.0 | 0.0 | 0.0 | 0.0 | 0.0 | 0.0 |
| Density (g/cm³) | (2.38) | 2.41 | 2.42 | 2.43 | (2.43) | (2.43) |
| Average coefficient of thermal expansion [10⁻⁷/° C.] | (57) | 57 | 68 | 72 | (74) | (70) |
| Tg [° C.] | (650) | 620 | 610 | 610 | (600) | (600) |
| Brittleness [μm⁻¹ᐟ²] | (5.3) | 5.3 | 5.4 | 5.4 | (5.5) | (5.5) |
| logρ | (8) | 7.8 | (8) | (7) | (8) | (8) |
| T₂.₅ [° C.] | (1610) | 1580 | 1520 | 1520 | (1470) | (1470) |
| T₄ [° C.] | (1240) | 1220 | 1180 | 1180 | (1140) | (1150) |
| Compaction [ppm] | — | 13 | — | 7 | 3 | 4 |

TABLE 2

| | Ex. | | |
|---|---|---|---|
| | 7 | 8 | 9 |
| SiO₂ | 79.4 | 77.2 | 76.0 |
| Al₂O₃ | 1.0 | 3.0 | 2.0 |
| MgO | 10.6 | 10.1 | 10.6 |
| CaO | 0.0 | 0.0 | 0.0 |
| SrO | 0.0 | 0.0 | 0.0 |
| BaO | 0.0 | 0.0 | 0.0 |
| Na₂O | 0.0 | 0.0 | 0.0 |
| K₂O | 9.0 | 9.7 | 11.4 |
| Na₂O + K₂O | 9.0 | 9.7 | 11.4 |
| CaO + SrO + BaO | 0.0 | 0.0 | 0.0 |
| Density (g/cm³) | (2.35) | (2.35) | (2.36) |
| Average coefficient of thermal expansion [10⁻⁷/° C.] | (57) | (62) | (71) |
| Tg [° C.] | (650) | (670) | (680) |
| Brittleness [μm⁻¹ᐟ²] | (5.3) | (5.3) | (5.2) |
| logρ | (11) | (11) | (11) |
| T₂.₅ [° C.] | (1700) | (1710) | (1670) |
| T₄ [° C.] | (1320) | (1330) | (1310) |

TABLE 3

| | Ex. | | | | | |
|---|---|---|---|---|---|---|
| | 10 | 11 | 12 | 13 | 14 | 15 |
| SiO₂ | 79.4 | 77.2 | 76.0 | 73.7 | 77.0 | 73.7 |
| Al₂O₃ | 1.0 | 3.0 | 2.0 | 4.0 | 2.0 | 4.0 |
| MgO | 10.6 | 10.1 | 10.6 | 10.3 | 11.0 | 10.3 |
| CaO | 0.0 | 0.0 | 0.0 | 0.0 | 0.0 | 0.0 |
| SrO | 0.0 | 0.0 | 0.0 | 0.0 | 0.0 | 0.0 |
| BaO | 0.0 | 0.0 | 0.0 | 0.0 | 0.0 | 0.0 |
| Na₂O | 5.0 | 3.7 | 6.0 | 4.0 | 7.0 | 3.0 |
| K₂O | 4.0 | 6.0 | 5.4 | 8.0 | 3.0 | 9.0 |
| Na₂O + K₂O | 9.0 | 9.7 | 11.4 | 12.0 | 10.0 | 12.0 |
| CaO + SrO + BaO | 0.0 | 0.0 | 0.0 | 0.0 | 0.0 | 0.0 |
| Density (g/cm³) | (2.37) | (2.37) | (2.39) | (2.38) | (2.39) | (2.38) |
| Average coefficient of thermal expansion [10⁻⁷/° C.] | (57) | (62) | (71) | (75) | (57) | (75) |
| Tg [° C.] | (650) | (660) | (640) | (650) | (660) | (650) |
| Brittleness [μm⁻¹ᐟ²] | (5.3) | (5.3) | (5.3) | (5.3) | (5.4) | (5.3) |
| logρ | (11) | (11) | (10) | (11) | (10) | (11) |
| T₂.₅ [° C.] | (1630) | (1660) | (1590) | (1620) | (1580) | (1630) |
| T₄ [° C.] | (1270) | (1290) | (1240) | (1270) | (1230) | (1280) |

TABLE 4

| | Ex. | | | | | |
|---|---|---|---|---|---|---|
| | 16 | 17 | 18 | 19 | 20 | 21 |
| SiO₂ | 59.9 | 66.5 | 72.0 | 76.3 | 75.9 | 76.4 |
| Al₂O₃ | 17.0 | 4.7 | 1.1 | 2.9 | 2.9 | 3.0 |
| B₂O₃ | 7.8 | 0.0 | 0.0 | 1.2 | 1.1 | 0.0 |
| MgO | 3.3 | 3.4 | 5.5 | 10.0 | 9.6 | 10.0 |
| CaO | 4.2 | 6.2 | 8.6 | 0.0 | 0.3 | 0.0 |
| SrO | 7.7 | 4.7 | 0.0 | 0.0 | 0.4 | 0.0 |
| BaO | 0.1 | 3.6 | 0.0 | 0.0 | 0.3 | 0.0 |
| Na₂O | 0.0 | 4.8 | 12.6 | 9.6 | 9.5 | 9.6 |
| K₂O | 0.0 | 4.4 | 0.2 | 0.0 | 0.0 | 0.0 |
| ZrO₂ | 0.0 | 1.7 | 0.0 | 0.0 | 0.0 | 1.0 |
| Na₂O + K₂O | 0.0 | 9.2 | 12.8 | 9.6 | 9.5 | 9.6 |
| CaO + SrO + BaO | 12.0 | 14.5 | 8.6 | 0.0 | 1.0 | 0.0 |
| Density (g/cm³) | 2.5 | 2.77 | 2.49 | (2.41) | (2.42) | (2.42) |
| Average coefficient of thermal expansion [10⁻⁷/° C.] | 37 | 83 | 86 | (54) | (53) | (57) |
| Tg [° C.] | 720 | 625 | 560 | (610) | (600) | (620) |

TABLE 4-continued

|  | Ex. | | | | | |
| --- | --- | --- | --- | --- | --- | --- |
|  | 16 | 17 | 18 | 19 | 20 | 21 |
| Brittleness [μm$^{-1/2}$] | 6.1 | 8.7 | 7.1 | (5.3) | (5.4) | (5.4) |
| logρ | (14) | (12) | (7) | (8) | (8) | (8) |
| T$_{2.5}$ [° C.] | 1660 | 1551 | 1461 | (1560) | (1560) | (1580) |
| T$_4$ [° C.] | 1268 | 1141 | 1040 | (1200) | (1200) | (1220) |
| Compaction [ppm] | — | — | — | 9 | — | — |

As evident from Tables 1 to 4, glass in each of Examples of the present invention (Examples 1 to 15, 19 and 20) has an average coefficient of thermal expansion of at most 75×10$^{-7}$/° C. and a Tg of at least 600° C., and accordingly when it is used as a glass plate for an LCD panel, the change in dimensions in a process for producing an LCD panel can be suppressed. Further, excellent flatness of glass is achieved since the B$_2$O$_3$ content is low, and in addition, it has a brittleness of at most 6.5 μm$^{-1/2}$ and is hardly damaged although it has a low B$_2$O$_3$ content. Further, since it contains a very small amount of an alkali metal oxide, specifically, at least one of Na$_2$O and K$_2$O, and is thereby excellent in the refining effect.

Further, as evident from Tables 1 and 4, glass in each of Examples of the present invention (Examples 2, 4 to 6, 19 and 20) has a compaction (C) of at most 20 ppm, and accordingly when it is used as a glass plate for a TFT panel, heat shrinkage of the glass plate can be suppressed in heat shrinkage at low temperature in a process for producing a TFT panel.

Glass in each of Examples 1 to 6, 19 and 20 has T$_{2.5}$ of at most 1,620° C. and has a low viscosity particularly in a glass melting step, and accordingly particularly high productivity is achieved, and an excellent refining effect is achieved.

Glass in each of Examples 7 to 9 has a Tg of at least 640° C., and accordingly the change in dimensions when heat load is applied as in a process for producing a panel and at the time of use of a panel, is particularly small.

Glass in each of Examples 10 to 15 has T$_{2.5}$ of at most 1,670° C. and has a low viscosity in a glass melting step, and accordingly high productivity is achieved, and an excellent refining effect is achieved. Further, it has a Tg of at least 620° C., and accordingly the change in dimensions when heat load is applied as in a process for producing a panel and at the time of use of a panel, is small.

On the other hand, in Example 16 in which B$_2$O$_3$ is contained in a large amount, the homogeneity of glass and the flatness when the glass is formed into a plate shape are likely to be influenced by the volatilization at the time of melting glass. Further, refining by SO$_3$ is insufficient since no alkali oxide is contained. Further, in Examples 17 and 18, the average coefficient of thermal expansion is so high as about 80×10$^{-7}$/° C., the change in dimensions in a process for producing an LCD panel may be influenced.

INDUSTRIAL APPLICABILITY

The glass plate for a substrate of the present invention is industrially useful as a glass substrate for an LCD panel, a glass plate for a solar battery substrate, etc., since the change in dimensions in a process for producing a panel is small, the influence over the display quality by thermal stress at the time of use of a panel is small, and further, the B$_2$O$_3$ content is low, and substantially no B$_2$O$_3$ is contained, whereby volatilization of B$_2$O$_3$ is small at the time of production of glass, and the environmental burden can be reduced.

The entire disclosure of Japanese Patent Application No. 2007-288086 filed on Nov. 6, 2007 including specification, claims and summary is incorporated herein by reference in its entirety.

What is claimed is:

1. A glass plate for a substrate, which comprises, as a glass matrix composition as represented by mass % based on oxide:

| SiO$_2$ | 68 to 80, |
| --- | --- |
| Al$_2$O$_3$ | 0.1 to 5, |
| B$_2$O$_3$ | 0 to 3, |
| MgO | 10 to 12, |
| CaO + SrO + BaO | 0 to 2, |
| Li$_2$O | 0 to 2, and |
| Na$_2$O + K$_2$O | 6 to 14 | has a density of at most 2.45 g/cm$^3$, has an average coefficient of thermal expansion from 50 to 350° C. of at most 75×10$^{-7}$/° C., has a glass transition point of at least 600° C., and has a brittleness of at most 6.0 μm$^{-1/2}$.

2. The glass plate for a substrate according to claim 1, which contains substantially no B$_2$O$_3$.

3. The glass plate for a substrate according to claim 1, which has a heat shrinkage (C) of at most 20 ppm.

4. The glass plate for a substrate according to claim 1, which comprises, as represented by mass % based on oxide:

| Na$_2$O | 6 to 14, and |
| --- | --- |
| K$_2$O | from 0 to less than 3 | and where the viscosity is η, has a temperature which satisfies log η=2.5 of at most 1,620° C.

5. The glass plate for a substrate according to claim 1, which comprises, as represented by mass % based on oxide:

| Na$_2$O | from 0 to less than 3, and |
| --- | --- |
| K$_2$O | 6 to 14 | and has a glass transition point of at least 640° C.

6. The glass plate for a substrate according to claim 1, which comprises, as represented by mass % based on oxide:

| Na$_2$O | 3 to 11, and |
| --- | --- |
| K$_2$O | 3 to 11 | has a glass transition point of at least 620° C., and where the viscosity is η, has a temperature which satisfies log η=2.5 of at most 1,670° C.

* * * * *